United States Patent
Senchuk et al.

(10) Patent No.: US 9,165,453 B2
(45) Date of Patent: Oct. 20, 2015

(54) RIP CURRENT SENSOR AND WARNING SYSTEM WITH ANCHOR

(71) Applicants: Earl Senchuk, Marquette, MI (US); Michael Rucinski, Ishpeming, MI (US)

(72) Inventors: Earl Senchuk, Marquette, MI (US); Michael Rucinski, Ishpeming, MI (US)

(*) Notice: Subject to any disclaimer, the term of this patent is extended or adjusted under 35 U.S.C. 154(b) by 65 days.

(21) Appl. No.: 13/740,186

(22) Filed: Jan. 12, 2013

(65) Prior Publication Data

US 2013/0181842 A1    Jul. 18, 2013

Related U.S. Application Data

(60) Provisional application No. 61/586,097, filed on Jan. 12, 2012.

(51) Int. Cl.
| | |
|---|---|
| E02D 5/74 | (2006.01) |
| E02D 5/42 | (2006.01) |
| G01F 15/00 | (2006.01) |
| G01L 5/00 | (2006.01) |
| G08B 21/00 | (2006.01) |
| G08B 21/08 | (2006.01) |
| G01C 13/00 | (2006.01) |
| G08B 21/02 | (2006.01) |

(52) U.S. Cl.
CPC .......... *G08B 21/084* (2013.01); *G01C 13/006* (2013.01); *G08B 21/02* (2013.01)

(58) Field of Classification Search
USPC .......................................................... 702/45
See application file for complete search history.

(56) References Cited

U.S. PATENT DOCUMENTS

| | | |
|---|---|---|
| 325,011 A | 8/1885 | Price |
| 868,798 A | 10/1907 | McLaughlin |
| 914,959 A | 3/1909 | Lallie |
| 1,153,653 A | 9/1915 | Voorhees |
| 1,852,414 A | 4/1932 | Hoff |
| 3,372,585 A | 3/1968 | Niskin |
| 3,411,354 A | 11/1968 | Josephson |
| 3,695,103 A | 10/1972 | Olson |
| 3,906,790 A | 9/1975 | Brainard, II et al. |
| 3,955,412 A | 5/1976 | Niskin |
| 4,091,666 A | 5/1978 | Niskin |
| 4,155,042 A * | 5/1979 | Permut et al. ............... 340/7.5 |
| 4,191,049 A * | 3/1980 | Bowditch et al. .......... 73/170.11 |
| 4,307,605 A | 12/1981 | Niskin |
| 4,545,243 A | 10/1985 | Niskin |
| 4,924,698 A * | 5/1990 | Echert et al. ............... 73/170.29 |
| 5,355,324 A * | 10/1994 | Zhang ........................... 702/45 |
| 5,644,077 A | 7/1997 | Fowler |
| 6,552,336 B1 | 4/2003 | Lloyd et al. |
| 7,278,293 B2 * | 10/2007 | Sierra et al. ................. 73/53.01 |
| 7,467,545 B2 | 12/2008 | Ankori |
| 2004/0194940 A1* | 10/2004 | Manasek et al. .............. 165/168 |
| 2008/0276702 A1* | 11/2008 | Ankori ........................ 73/204.16 |
| 2012/0143383 A1* | 6/2012 | Cooperrider et al. ......... 700/295 |

* cited by examiner

*Primary Examiner* — Jennifer Mehmood
*Assistant Examiner* — Pameshanand Mahase
(74) *Attorney, Agent, or Firm* — Vincent Re PLLC

(57) ABSTRACT

A rip current can include a dangerous flow of water from an area proximate to a beach out to deeper water. An apparatus for generating a rip current warning indication includes an anchor device situated in the water, a flow sensor affixed to the anchor device and monitoring a water current speed, and a warning device in signal communication with the flow sensor. The warning device includes a control module comparing the monitored water current speed to a water current speed threshold. The warning device generates the rip current warning indication based upon the comparing.

20 Claims, 11 Drawing Sheets

WATER BASED UNIT

SHORE BASED UNIT

RIP CURRENT SENSOR AND WARNING SYSTEM WITH ANCHOR

CROSS REFERENCE TO RELATED APPLICATIONS

This disclosure claims the benefit of U.S. Provisional Application No. 61/586,097 filed on Jan. 12, 2012 which is hereby incorporated by reference.

TECHNICAL FIELD

This disclosure is related to a sensor easily installed for detecting a rip current proximate to a beach or other swimming areas. In particular, the present disclosure provides a system for warning people in the water and on the beach that a rip current is present.

BACKGROUND

The statements in this section merely provide background information related to the present disclosure. Accordingly, such statements are not intended to constitute an admission of prior art.

Normal waves strike the shore obliquely, thereby dispensing most of their energy at the shoreline. Rip currents occur when waves, usually a result of weather pressure systems, strike the shore perpendicularly, and with greater force. This causes a buildup of excess water trying to return seaward. Larger than normal wave pressure carries sand upwards toward the shore and depending upon where the sand gets dispensed, it can create a sandbar barrier to wave water looking for an avenue to return to sea. A rip current occurs when the trapped water erodes a trough through the sandbar. Large objects like jetties, piers, or naturally occurring objects like rocks can also channel excess water, sometimes parallel to shore. The flow created by returning wave water is called a rip current. Five different types of rip currents have been identified by experts. When the water current runs parallel to shore, it is referred to as a longshore current. A swimmer can be drawn sideways along the beach and into a rip current if the returning water force is strong enough.

Rip currents result in 80% of the 60,000 water rescues annually in the United States alone. Up to 150 beachgoers drown every year just in the United States. A dangerous rip current may be as slow as 1 to 2 ft/sec (0.7 to 1.4 mph) on up to 8 ft/sec (5.45 mph). Rip currents can occur near the surface.

A rip current can be 40 feet wide on up to 50 yards wide. They can occur anywhere on a shore of an ocean beach or large lake, e.g., the Great Lakes.

Known methods to anchor an object or device in a large body of water include using a large anchor object which is dropped in the water and rested upon the floor of the water. Placement and maintenance of such an anchor object, due to its size and difficulties associated with working underwater, can be labor intensive and costly. Wherein the floor made of sand which is subject to shifting and constant change, a location of an object on the floor of the water can change substantially over time. Known methods do not permit maintaining anchors in sandy floor locations in an upright orientation for long periods of time.

SUMMARY

A rip current can include a dangerous flow of water from an area proximate to a beach out to deeper water. An apparatus for generating a rip current warning indication includes an anchor device situated the water close to the beach, a flow sensor affixed to the anchor device and monitoring a water current speed, and a warning device in signal communication with the flow sensor. The warning device includes a control module comparing the monitored water current speed to a water current speed threshold. The warning device generates the rip current warning indication based upon the comparing.

BRIEF DESCRIPTION OF THE DRAWINGS

One or more embodiments will now be described, by way of example, with reference to the accompanying drawings, in which.

DETAILED DESCRIPTION

Figure 1B:
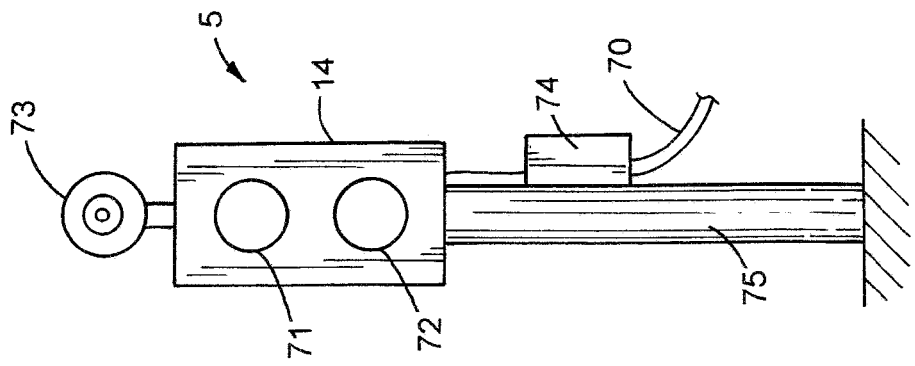
FIG. 1B illustrates an exemplary warning device in electronic or signal communication with a rip current sensor, in accordance with the present disclosure.

Referring now to the drawings, wherein the showings are for the purpose of illustrating certain exemplary embodiments only and not for the purpose of limiting the same, occurrence of a rip current along a beach of a large body of water can occur rapidly and without any warning. Beachgoers or people wading in the water can quickly be imperiled by strong currents pulling the persons out into deep water. Strong currents can pull directly out to the deep water as a rip current, or strong currents can pull along the shore as a longshore current, with the longshore current frequently leading to a rip current. A system is disclosed to detect strong water currents in a beach environment, in particular, in beach environments wherein a sandy floor of the water is subject to rapid changes or shifting.

Flow meters are known in the art to monitor flow of a fluid, for example, through a tube or other vessel. A flow meter can include in one embodiment an impeller flow meter. A flow meter in another embodiment can include a turbine flow meter. Flow meters illustrated herein include impeller flow meters including propeller or fan blades configured as known in the art for monitoring a liquid flow through the meter, however, a number of flow meter configurations are envisioned for use within the sensors disclosed herein. The disclosure is not intended to be limited to the specific examples provided.

A rip current flow sensor is disclosed herein for monitoring a water flow in relation to the fixed location of the sensor and determining whether a flow in excess of or greater than a threshold water flow is occurring. Based upon the comparison of the measured or monitored flow to the threshold flow, an indication is provided that a rip current could be occurring or that a rip current is occurring and that an evacuation is required. Throughout the disclosure, a rip current and rip current sensors are provided. Longshore currents can be perilous and can sweep a person along the shore into a rip current. Sensors disclosed herein can include a sensor swivel and an accompanying orientation fin to orient the sensor in a direction of the flow. Systems and methods disclosed herein directed to a rip current are equally applicable to a longshore current, and the disclosure intends the systems and methods to be enabled for both conditions throughout except as specifically limited.

A measured water current speed can be measured and compared to a water current speed threshold, and if the monitored speed is in excess of the speed threshold, then a rip current can be indicated and a rip current warning generated. In another embodiment, two thresholds can be used, for example with a first, lower magnitude speed threshold being used to indicate a possible rip current and a second, higher magnitude speed threshold being used to indicate a confirmed rip current.

Local authorities can set thresholds to any level deemed appropriate to indicate a rip current. The National Oceanic and Atmospheric Administration (NOAA) officially designates a rip current as having a minimum flow of one foot per second. According to one embodiment of the present disclosure, a monitored water flow current of at least one foot per second sustained for a minimum of ten seconds can be used to indicate occurrence of a rip current. The duration timer can be important in that it identifies that an actual rip current is happening and not just an abnormal wave returning seaward. The alarm can be set to go off at lower speeds and is adjustable to that effect by the user for added safety. The duration timer can be set for longer or shorter periods. An alarm sound can also be set to stop after a set duration, but the flashing light will continue as long as the current maintains a speed of 1 ft/sec.

Figure 1A:
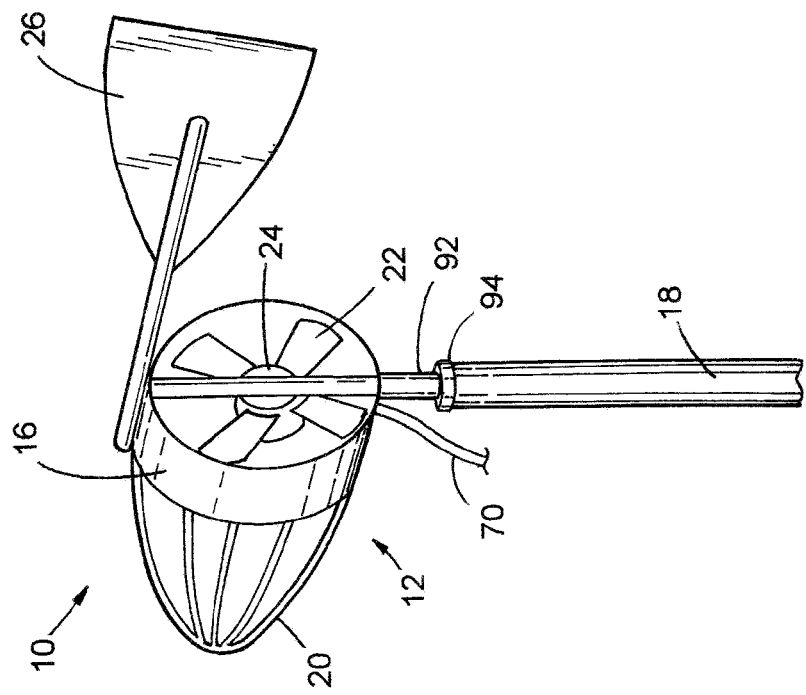
FIG. 1A illustrates an exemplary rip current sensor configured to operate underwater and provide an indication of water current, in accordance with the present disclosure.

FIG. 1A illustrates an exemplary rip current sensor configured to operate underwater and provide an indication of water current. A rip current sensor and warning system 10 includes a submerged riptide current sensor or flow sensor 12. Sensor 12 includes a cylindrical sensor body 16, impeller blades 22, sensor motor/generator 24, vertical orientation fin 26, and sensor mesh 20. Fin 26 is aligned with a longitudinal axis of body 16 and impeller blades 22, such that a water current acting upon fin 26 aligns the sensor longitudinal axis to be parallel to the flow of the water. Sensor 12 is mounted to support pole 18 with a attachment pole 92 and swivel 94, such that sensor 12 is configured to turn in orientation with the water current. In this way, sensor 22 is configured to accurately monitor or measure a magnitude of the water current, for example, as a velocity of the water. Sensor motor/generator 24 includes an electric machine known in the art to include an exemplary rotor and stator, wherein a spinning shaft of the sensor motor/generator 24 converts the spinning shaft into an electrical signal. Water current flowing over impeller blades 22 spins the shaft of sensor motor generator 24. The electrical signal of sensor motor/generator 24 is proportional to the rotational velocity of the spinning shaft. Such a sensor motor/generator 24 can be calibrated to accurately measure a flow speed past the sensor motor/generator 24 and provide the electrical signal as a sensor output that can be used to estimate the flow speed. Sensor motor/generator 24 includes a device configured to operate underwater according to methods known in the art. Sensor motor/generator 24 provides a sensor output providing a flow speed through exemplary cable 70, the cable comprising any wire or set of wires capable of providing for signal communication between two items. Cable 70 can additionally include any electrical power supply required by sensor 12, as required. In other embodiments, sensor 12 can include a battery to provide power to sensor 12 as needed. Such a battery can be periodically replaced and/or can receive an electrical charge from operation of sensor motor/generator 24. In another embodiment, sensor 12 can include a solar panel projecting above a surface of the water to receive an electrical charge from the solar panel. In another embodiment, a group of sensors can be connected to a single solar panel projecting above the surface of the water and can each receive an electrical charge from the solar panel.

A sensor can be made to pivot through unlimited travel, spinning through as many turns as the current makes the sensor travel. Such a configuration is useful when the sensor is being used to monitor multi-directional rip currents or longshore currents. A sensor can be limited to travel in a confined range of angles, such that the sensor is, for example, always facing within forty-five degrees of a proximate shoreline. In this way, the sensor is never oriented away from the shoreline and in a condition wherein detection of a current is delayed while the sensor awaits reorientation by the current. In another embodiment wherein rip currents come from a predictable direction, a sensor can be fixed to a particular orientation.

FIG. 1B illustrates an exemplary warning device in electronic or signal communication with a rip current sensor. Warning device 14 is mounted in a location whereat beachgoers and people in the water can observe and/or hear the warning device and any warning issued by device 14. Warning device 14 is in one of any forms of signal communication known in the art with sensor 12. Warning device 14 can indicate a rip current indication including visual, audio, or other indications. In the exemplary embodiment of device 14, the device includes warning lights 71 and 72 and audio warning device 73. Warning lights 71 and 72 can include incandescent traffic signal-type lights, LED lights, or any other form of illumination known in the art. In one embodiment, one of warning lights 71 and 72 provides an all clear signal, for example, including a green, blue, or white indication that the system is operating and that no rip current is currently detected. A second of warning lights 71 and 72 can include a yellow, orange, or red indication, either flashing or steady, indicating to the viewer that a alarm is being sounded. Audio warning device 73 can include a harsh siren sound, a recorded verbal message, or any other audio indication to the proximate public that attention is required. In one embodiment, warning device 14 can additionally be connected to a communications network to provide an indication to an emergency response system including local authorities and the Coast Guard that a rip current has occurred and response may be required.

Exemplary warning device 14 includes a support pole and a control module 74 included therewith. Exemplary cable 70 is illustrated providing signal communication between device 14 and sensor 12. Device 14 can be connected to a plurality of sensors 12, such that a warning can be issued based upon signals from any of the sensors. Control module 74 can be embodied as a single device or can include functions performed across a plurality of electronic devices. Control module 74 compares the monitored water current speed to a water current speed threshold or thresholds and can generate a rip current indication signal based upon the comparing.

Control module 74 can include a processing device. The processing device can include memory, e.g., read only memory (ROM) and random access memory (RAM), storing processor-executable memory (ROM) and random access memory (RAM), storing processor-executable instructions and one or more processors that execute the processor-executable instructions. Any combination of one or more computer-usable or computer-readable media may be utilized within control module 74. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments in accordance with the present invention may be embodied as an apparatus, method, or computer program product. Accordingly, functions performed by the control module 74 or other functions disclosed herein can take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied as any tangible medium of expression having computer-usable program code embodied in the medium.

Figure 2:
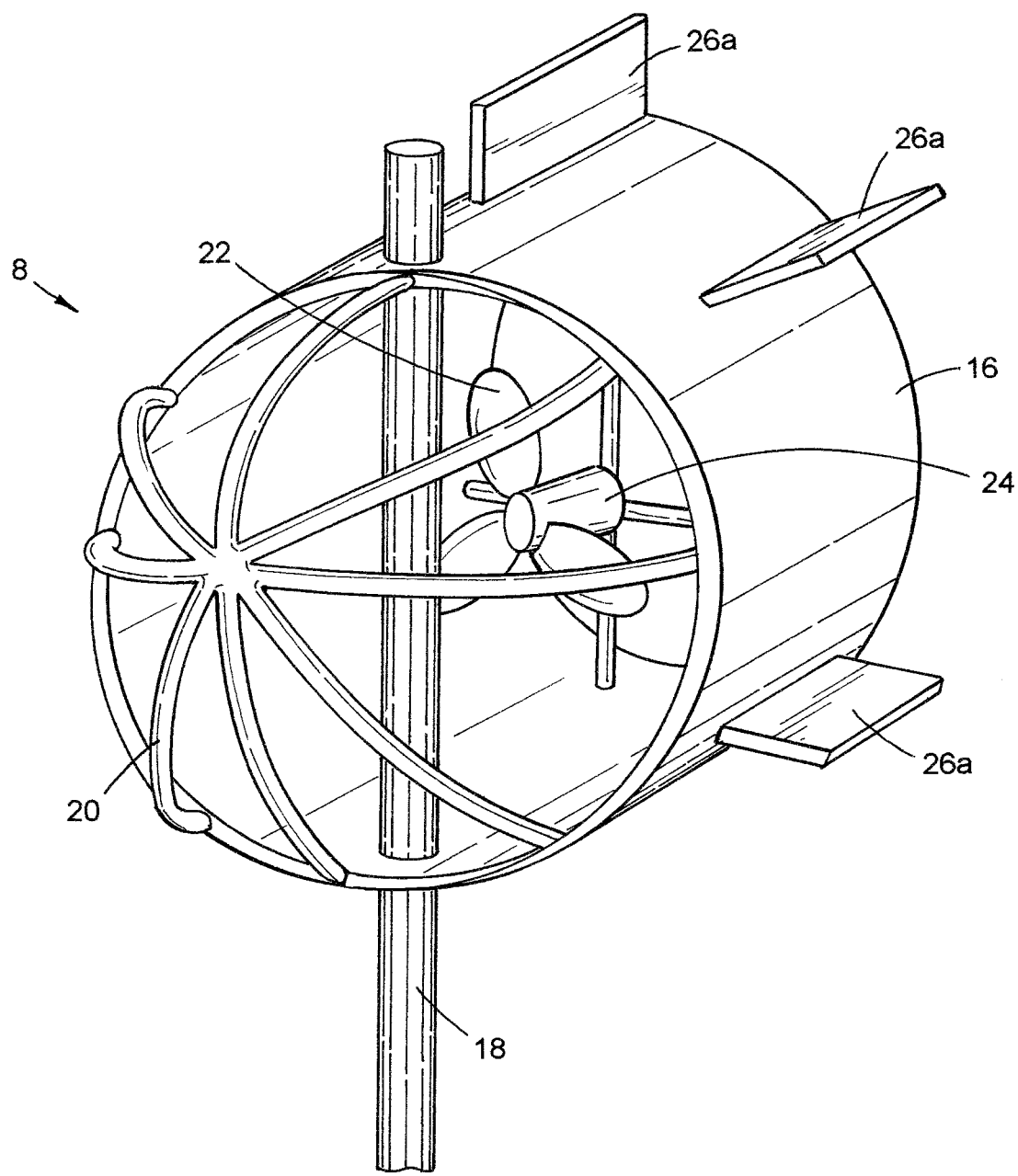
FIG. 2 illustrates an alternative embodiment of an exemplary rip current sensor configured to operate underwater and provide an indication of water current, in accordance with the present disclosure.

FIG. 2 illustrates an alternative embodiment of an exemplary rip current sensor configured to operate underwater and provide an indication of water current. Rip current sensor 8 includes sensor body 16, impeller blades 22, sensor motor/generator 24, orientation fins 26a, and sensor mesh 20. Sensor mesh 20 is configured to keep large particles, debris, plant life, or other contaminants from clogging the sensor. A set of wires or bars protruding from body 16 are illustrated uniting at a single point. Other configurations such as a square mesh or a honeycomb configuration can be used in mesh 20. A number of mesh configurations can be used, and the disclosure is not intended to be limited to the particular design provided. Fins 26a are aligned with a longitudinal axis of body 16 and impeller blades 22, such that a water current acting upon fins 26a aligns the sensor longitudinal axis to be parallel to the flow of the water. Sensor 12 is mounted to support pole 18. Pole 18 can rotate, or sensor 78 can be configured to rotate about pole 18, such that the sensor will turn about a radial direction of pole 18. In another configuration, sensor 8 could be attached to pole 18 to rotate through horizontal and vertical directions, such that a velocity of a flow speed can be most accurately measured.

Figure 3:
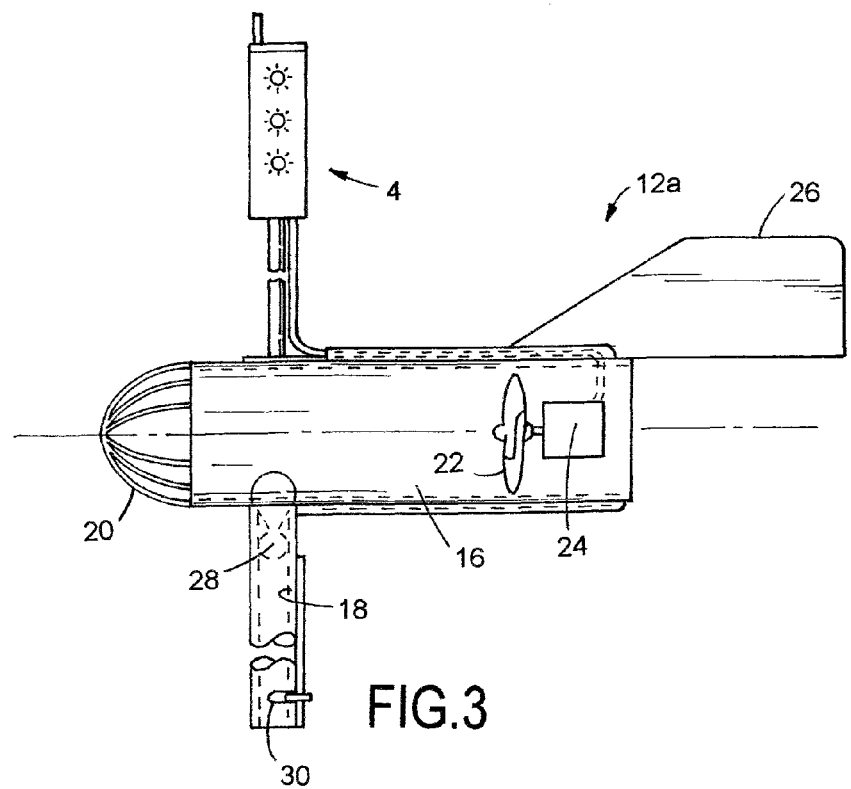
FIG. 3 schematically illustrates an exemplary rip current sensor device in cross-section and an exemplary warning device connected thereto, in accordance with the present disclosure.

FIG. 3 schematically illustrates an exemplary rip current sensor device in cross-section and an exemplary warning device connected thereto. Rip current sensor 12a includes sensor body 16, impeller blades 22, sensor motor/generator 24, orientation fins 26, and sensor mesh 20. Support pole 18 is illustrated including a ball and point bearing 28 mounted at a junction of the body 16 and support pole 18 to allow the sensor to rotate easily. To limit a range of rotation about the pole 18 a pin/slot combination, denoted collectively as feature 30, prevents the sensor from freely rotating about the pole. Sensor 12a further includes a warning device 4 including warning lights 6 mounted above body 16, such that warning device 4 can extend above a surface of the water and provide a signal to people proximate to the sensor of a rip current detection. Warning device 4 can include therewithin a control module with computerized functionality as disclosed herein.

Figure 4:
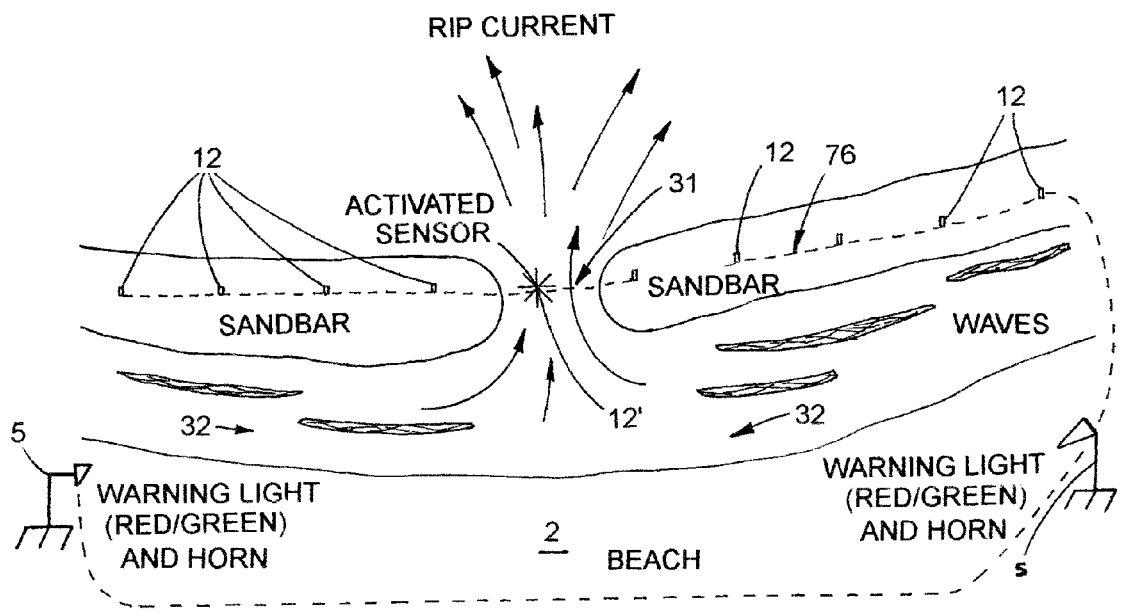
FIG. 4 illustrates an exemplary beach area including sandbars, with a series of rip current sensors installed thereto, in accordance with the present disclosure.

FIG. 4 illustrates an exemplary beach area including sandbars, with a series of rip current sensors installed thereto. Sandbar 76 is illustrated situated parallel to beach 2. Prior to an illustrated occurrence of a rip current, sandbar 76 extended across the illustrated area. Sandbar 76 includes a pile of sand underwater, and hydraulic forces upon the sandbar 76 can be immense. Pooled water area 32 can include a great deal of water, and as water on an opposite side of sandbar 76 retreats, the weight of the water in pooled water area 32 pushes on sandbar 76. FIG. 4 illustrates a collapsed section 31 in sandbar 76, such that a rip current can occur through collapsed section 31. A system to indicate a rip current warning including a line of sensors 12 is illustrated positioned to sandbar 76, such that water current speeds along the sandbar are monitored. As section 31 collapses, water from pooled area 32 rushes through the section 31 at higher than normal speeds. A sensor 12' located in section 31 can originally have been located above sandbar 76 or could have been buried within the sand of sandbar 76. As collapsed section 31 gives way and water rushes through section 31, sand flows out of section 31, uncovering sensor 12' if it was originally buried. Sensor 12 is signally connected to warning devices 5. Each of warning devices 5 are configured to monitor signals from the sensors 12 including sensor 12'. As the indicated water current speed surpasses a threshold speed, a rip current warning can be indicated and provided to people in the area.

Sensors 12 are illustrated located along sandbar 76. Sensors 12 could alternatively be one either side of the sandbar and still monitor water current speeds indicative of a rip current and be effective.

The system of FIG. 4 is located proximately to a beach. Conditions can exist away from a beach that similarly can benefit from the systems and methods disclosed herein. For example, an island in a body of water such as the Great Lakes can be close enough to other land that swimmers venture out to reach the island. The floor under the water can include a sandbar. Longshore currents in the water can result in shifts in the sandbar, restricted channels in the water flow, and unexpectedly strong currents that can sweep swimmers away from their intended destination and into deep water. Flow sensors can be used to warn swimmers in such areas.

Figure 5:
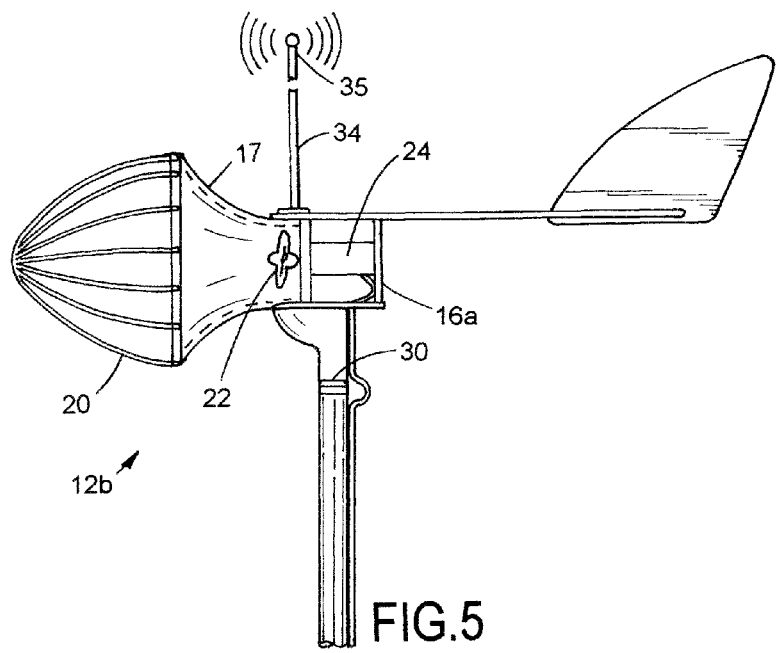
FIG. 5 schematically illustrates an exemplary rip current sensor device in cross-section and an exemplary warning device connected thereto, wherein the sensor includes a tapered nozzle configuration, in accordance with the present disclosure.

FIG. 5 schematically illustrates an exemplary rip current sensor device in cross-section and an exemplary warning device connected thereto, wherein the sensor includes a tapered nozzle configuration. Sensor 12b includes sensor body 16a, impeller blades 22, sensor motor/generator 24, and sensor mesh 20. Sensor body 16 includes a tapered nozzle configuration. A tapered nozzle receiving a slower flow at a wide end of the nozzle converts the flow to a higher speed flow in the narrower section of the nozzle. In this way, a water current speed can be amplified for greater resolution in a sensor monitoring and estimating the speed to the water current speed. Sensor 12b is illustrated including support 34 including antenna 35 extending above a surface of water. Antenna 35 permits sensor 12b to communicate with a warning device wirelessly.

Figure 6:
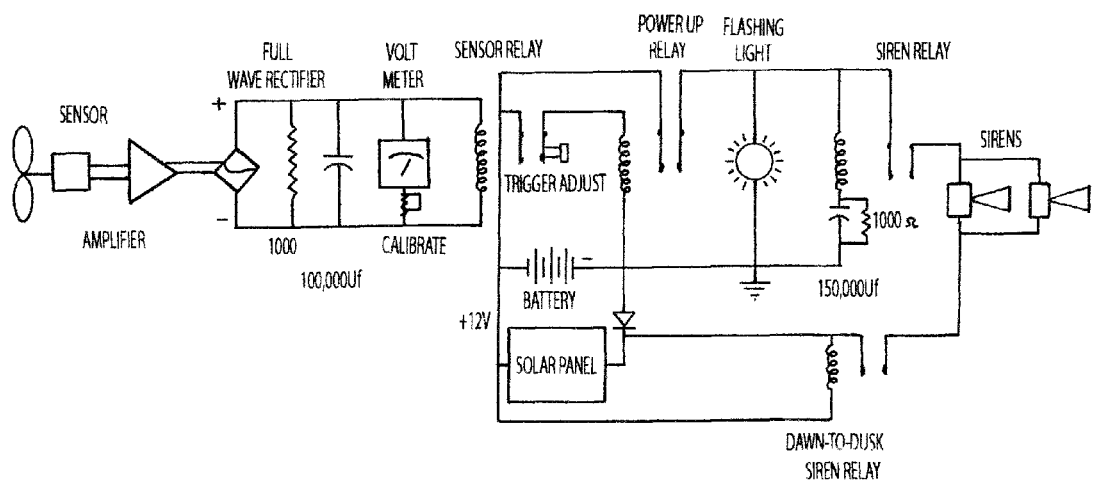
FIG. 6 schematically illustrates an electrical diagram exemplifying operation of a rip current sensor and a warning device, in accordance with the present disclosure.

An electronically controlled control module can include a computerized processor and programming configured according to the methods disclosed herein. In another embodiment, the method disclosed to monitor a sensor reading and compare the monitored value to a threshold value can be accomplished through an electronically controlled control module including solid state circuitry not including a processor. FIG. 6 schematically illustrates an electrical diagram exemplifying operation of a rip current sensor and a warning device. FIG. 6 illustrates according to conventions known in the art electrical components required to operate one embodiment of a rip current sensor and warning system as disclosed herein.

Figure 7A:
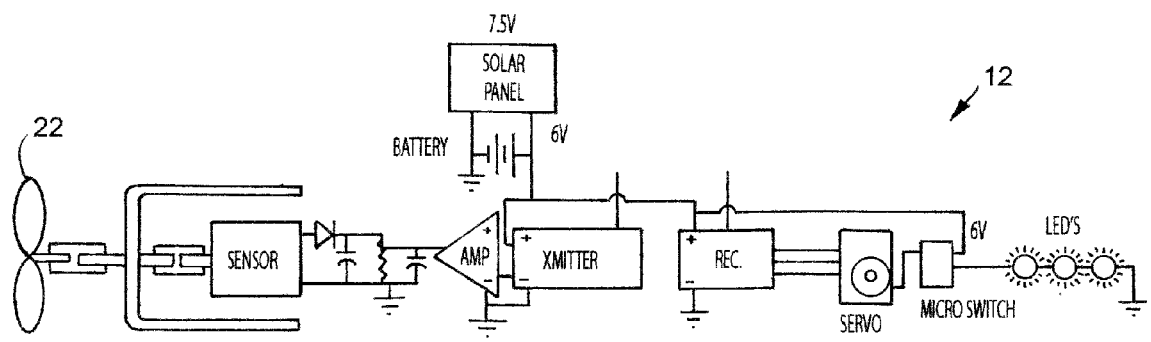
FIG. 7A schematically illustrates an electrical diagram of an exemplary rip current sensor including a solar panel and a signal transmitter device, in accordance with the present disclosure.

FIG. 7A schematically illustrates an electrical diagram of an exemplary rip current sensor including a solar panel and a signal transmitter device. FIG. 7A illustrates according to conventions known in the art electrical components required to operate one embodiment of a rip current sensor 12, including impeller 22, as disclosed herein.

Figure 7B:
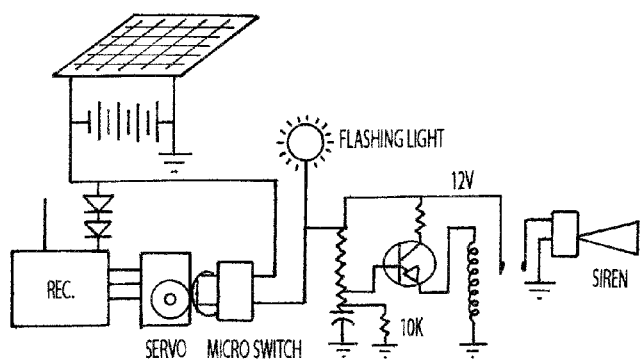
FIG. 7B schematically illustrates an electrical diagram of an exemplary warning device configured to receive a transmitted signal from a rip current sensor, in accordance with the present disclosure.

FIG. 7B schematically illustrates an electrical diagram of an exemplary warning device configured to receive a transmitted signal from a rip current sensor. FIG. 7A illustrates according to conventions known in the art electrical components required to operate one embodiment of a land or shore based warning device 14, as disclosed herein.

Figure 10:
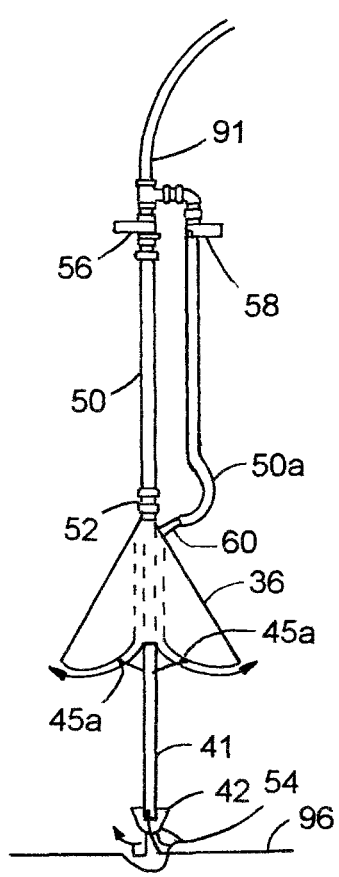
FIG. 10 illustrates an exemplary anchor system configured for installation to a sandy floor, in accordance with the present disclosure.

FIG. 10 illustrates an exemplary anchor system configured for installation to a sandy floor. Concrete anchor 36 is illustrated with a central pipe 41 configured therewithin. Any number of anchor devices, shapes, and materials can be utilized, with concrete anchor 36 being presented as a non-limited example which can easily be formed around the illustrated pipes according to methods known in the art. Pipe 41 includes a top fitting 52, for example, including a threaded fitting ready to accept connection to a second pipe. Pipe 41 can be section and include threaded fittings between the sections to enable easier transport. Such a threaded fitting can also enable used of a flow restrictor between pipe sections, for example, to limit how much water flows through a lower section of pipe 41 and maximize water flow to other regions of the anchor. Such a flow restrictor can be selected based upon the specific size and configuration of the anchor and a measure of the water pressure available to install the anchor. Concrete anchor 36 is further configured to include pipes therewithin connecting an installation spray inlet 60 to a plurality of installation spray outlets 45a. Spray outlets 45a are configured to spray a large amount of water out radially from a bottom of concrete anchor 36, such that when the anchor comes to rest on a sandy bottom 96, water jetting from spray outlets 45a displaces sand and enables concrete anchor 36 to quickly become buried beneath sandy bottom 96. Pipe 41 extends below concrete anchor 36 and includes an installation tip 42 and includes a tip jet opening 54. By the lower section of pipe 41 extending down below the anchor, the vertical orientation of the anchor can be sustained for a long period of time. Pipe 41 can be sized based upon flow requirements through the pipe and intended structural rigidity of the pipe over time. In addition to water flowing though spray outlets 45a, water can be pushed through pipe 41 and out of opening 54, such that sand can be pushed away from installation tip 42. As concrete anchor 36 is lowered toward sandy bottom 96, installation tip 42 enters the sand and stabilizes an orientation of the anchor.

Water can be provided to inlet 60 and fitting 52 through removable water lines 50a and 50, respectively. Water can be selectively turned on to lines 50a and 50 through valves 58 and 56, respectively. Water is supplied from above the water through water supply line 91. Water emanating from spray outlets 45a may push enough sand out of the way that the concrete anchor 36 settles on its own. In another embodiment, a rocking and/or turning action applied to a top of the attached pipes can change an orientation of the sprays coming from outlets 45a, thereby aiding the settling of the concrete anchor. As the concrete anchor 36 is installed, removable water lines 50a and 50 can be removed.

Figure 8:
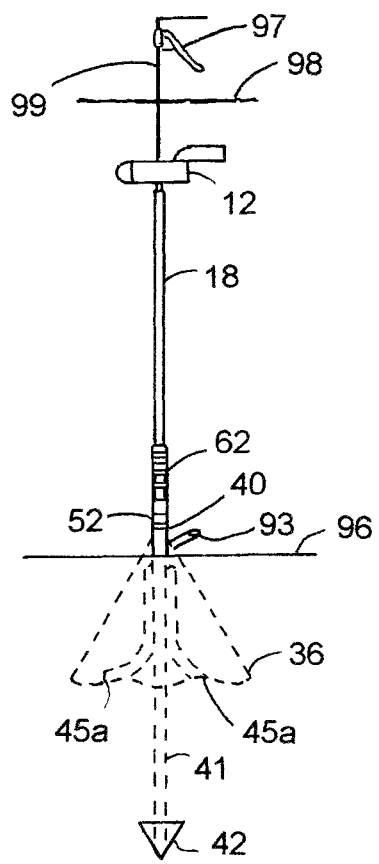
FIG. 8 illustrates an exemplary anchor system installed to a sandy floor including a rip current sensor, in accordance with the present disclosure.

FIG. 8 illustrates an exemplary anchor system installed to a sandy floor including a rip current sensor. Concrete anchor 36 is located somewhat or completely below sandy floor 96. End 40 of concrete anchor 36 is left exposed above the sandy bottom 96, such that top fitting 52 remains exposed, and an exemplary diver can install or maintain items attached to the anchor. Concrete anchor 36 includes central pipe 41 and spray outlets 45a included therewithin, with ends of the pipe and outlets respectively extending from the anchor. Pipe 41 includes an installation tip 42 extended within the sandy floor 96. Pipe 41 includes top fitting 52, for example, including a threaded fitting ready to accept connection to a second pipe. Support pipe 18 is illustrated supporting sensor 12. Support pipe 18 can be directly attached to top fitting 52. In the illustrated example of FIG. 8, a flexing device embodied as a spring coupler 62 is illustrated installed between support pole 18 and top fitting 52, such that if a boat, a piece driftwood, or any other object impacts support pole 18 or sensor 12, the spring coupler 62 can flex, permitting the support pole to move relative to the anchor, thereby limiting damage to the pole or the sensor. Cap 93 is illustrated installed to cover an inlet that was used during the installation of the anchor. Sensor 12 is illustrates with a solar panel 97 being supported above waterline 98 by support pole 99.

Figure 9:
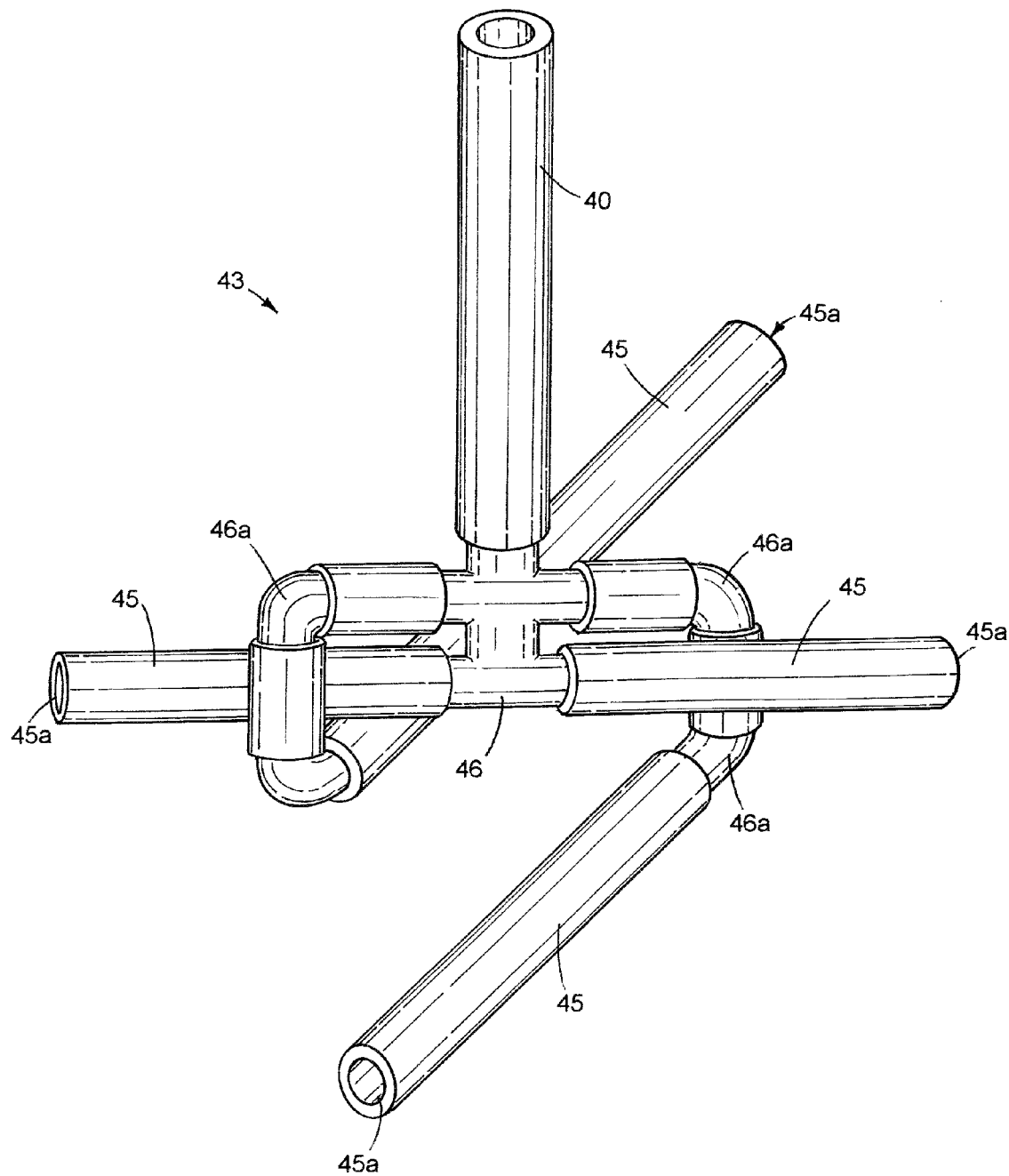
FIG. 9 illustrates and exemplary hose configuration for providing a four outlet anchor spray system, in accordance with the present disclosure.

FIG. 9 illustrates and exemplary hose configuration for providing a four outlet anchor spray system. Configuration 43 can be constructed and placed in a mold while concrete or other material for a concrete anchor are poured around configuration 43 and permitted to harden. Outlets 45 are exposed on a bottom side of an anchor device to clear sand away from the bottom of the anchor. Four outlet junction 46 are used to connect water supply tube 40 to each of four water lines leading to outlets 45a. In one example, a plurality of right angle connectors 46a are used to connect tube sections to tubes 45 leading to outlets 45*a*. Configuration 43 is one example of a tube or pipe configuration that could be used to route water to outlets 45*a*, and the disclosure is not intended to be limited to the particular examples provided herein.

Figure 11:
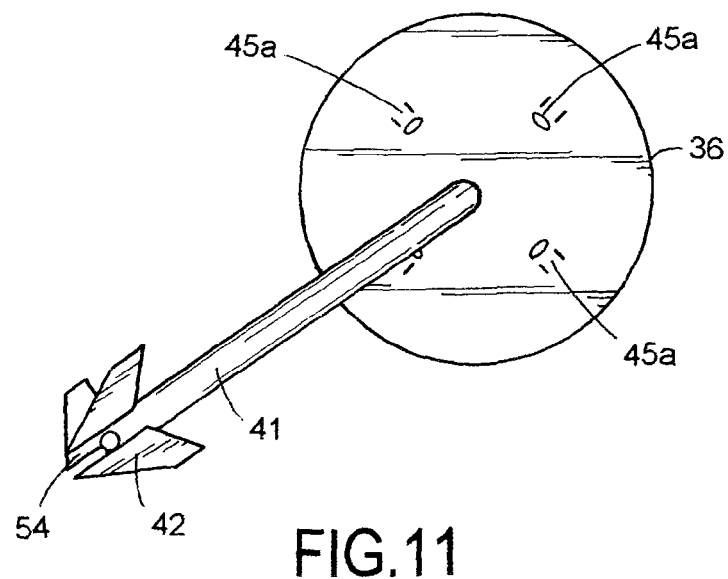
FIG. 11 illustrates an exemplary anchor system including a four outlet anchor spray system, an orientation pole, and a four pronged installation tip, in accordance with the present disclosure.

FIG. 11 illustrates an exemplary anchor system including a four outlet anchor spray system, an orientation pole, and a four pronged installation tip. Anchor 36 is illustrated tipped on its side as if it were on a boat awaiting to be lowered over the side for installation. Pole 41 is illustrated coming from a center of the bottom of the anchor 36. Pole 41 includes a four pronged installation tip 42 and open end outlet 54 from which water can be sprayed. Additionally, four outlets 45*a* are illustrated formed in the bottom of anchor 36. Any number of spray outlets and outlet geometries can be used, and the four outlet configuration illustrated is provided as a non-limiting example. In one example, the outlets can be flattened out so that water is sprayed in a fan pattern. In another example, the outlets are round, such that as concentrated of a spray as possible. Different spray configurations can be used, for example, based upon different types of sand that can be found in different locations.

Figure 12:
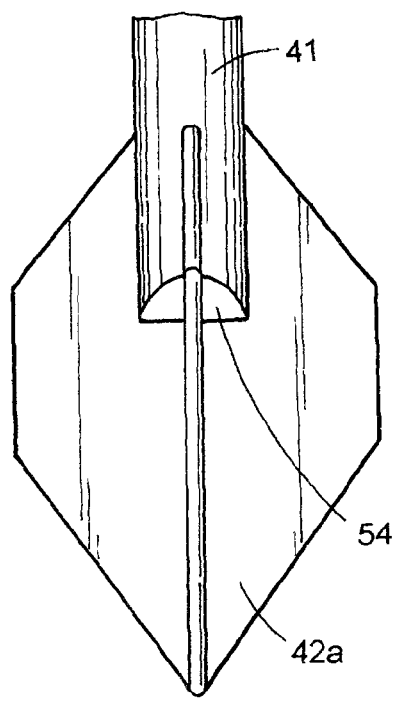
FIG. 12 illustrates an exemplary arrowhead installation tip, in accordance with the present disclosure.

FIG. 12 illustrates an exemplary arrowhead installation tip. Arrowhead tip 42*a* installed to pipe 41 can be used in place of a four pronged installation tip. Arrowhead tip blocks a portion of outlet 54, but it also prevents stones, gravel, or other material from plugging the end of outlet 54.

Figure 13:
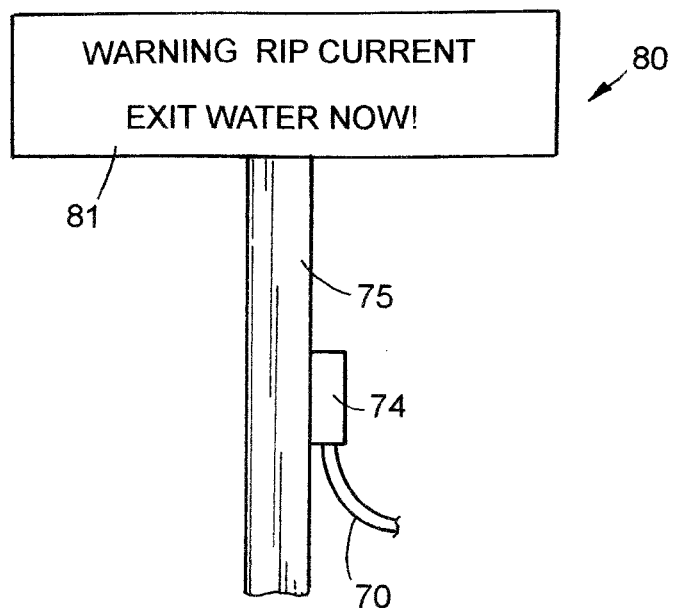
FIG. 13 illustrates an exemplary warning device including a textual display screen, in accordance with the present disclosure.

FIG. 13 illustrates an exemplary warning device including a textual display screen. A number of embodiments of warning devices are envisioned. Configuration 80 includes a sign capable of displaying text message 81 telling beach-goers to exit the water immediately. Support pole 75 includes control module 74 monitoring sensor data through cable 70, making necessary comparisons to determine whether a warning is appropriate, and displaying message 81. The sign displaying the text message can be any light bulb, LED, liquid crystal display, or any other device known in the art to display text. In some instances a graphic illustrating a rip current can be used in place of or in addition to the text message 81.

Figure 14A:
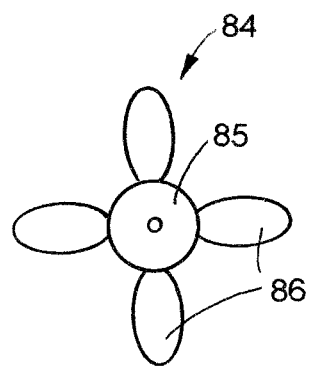
FIGS. 14A and 14B illustrate exemplary fan blade configurations that can be used within a rip current sensor, in accordance with the present disclosure.
Figure 14B:
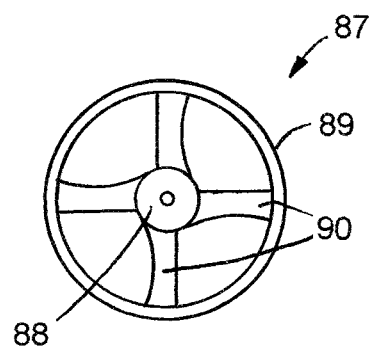

FIGS. 14A and 14B illustrate exemplary fan blade configurations that can be used within a rip current sensor. FIG. 14A illustrates impeller 84 including core 85 surrounded by blades 86. FIG. 14B illustrates impeller 87 including core 88 surrounded by blades 90 reinforced by ring 89. A number of impeller configurations could be used with the sensors disclosed herein, and the disclosure is not intended to be limited to the examples provided herein.

Figure 15A:
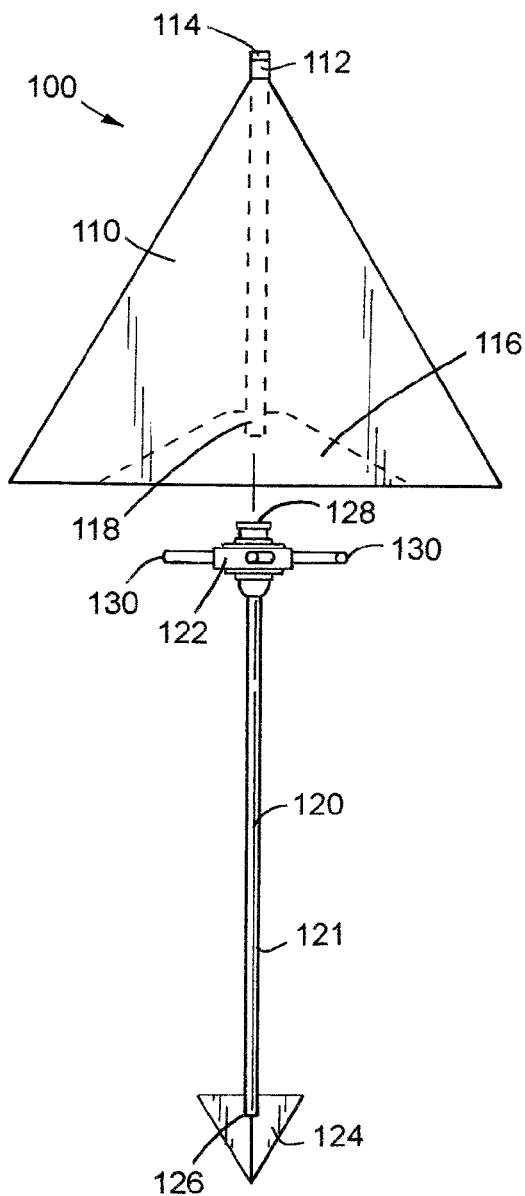
FIGS. 15A and 15B illustrate an exemplary alternative embodiment of an anchor system including a spinner head configuration, in accordance with the present disclosure.
Figure 15B:
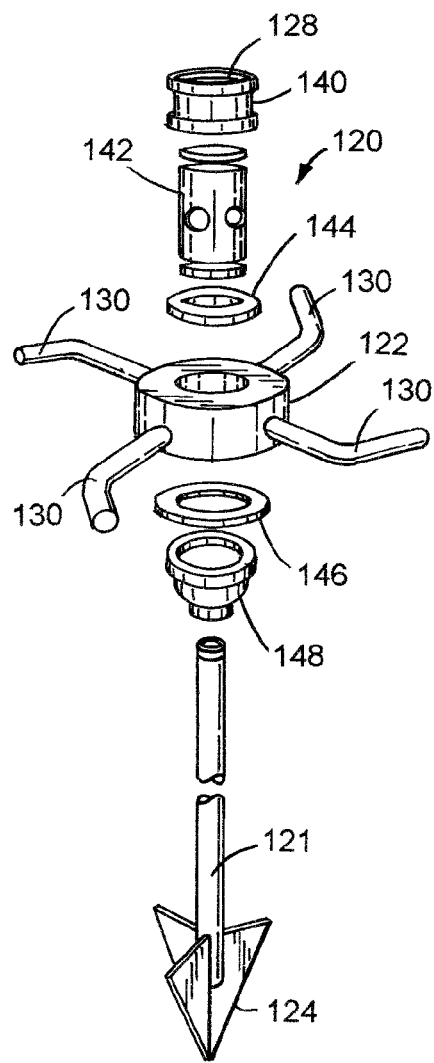

FIGS. 15A and 15B illustrate an exemplary alternative embodiment of an anchor system including a spinner head configuration. Configuration 100 includes anchor device 110, pipe 112 interior to the anchor device, and spinner head assembly 120. Pipe 112 includes a top fitting 114 for connection to a water supply pipe and/or a support for connection to a sensor and a lower fitting 118. Anchor 110 includes a recess 116 for receiving a spinner head 122 of spinner head assembly 120. Spinner head assembly includes spinner head 122, extension anchor pipe 121, fitting 128 for connection to lower fitting 118, outlet 126 and arrowhead tip 124. Spinner head 122 includes a plurality of spray arms 130 extending outward.

FIG. 15B illustrates spinner head assembly 120 in detail. Spinner head 122 includes a plurality of curved spray arms 130, such that water spraying from the arms can create a torque upon the arms tending to spin the spinner head. Fitting 128 is illustrated with a widened section 140, such that in combination with shaft pipe 142 and fitting 148, spinner head 122 is held in place between fittings 128 and 148 and permitted to spin around shaft pipe 142. Shaft pipe 142 includes a plurality of holes, permitting water being supplied though pipe 112 to fitting 128 can be distributed to spinner head 122. Exemplary Teflon® washers 144 and 146 are included between the fittings and the spinner head to facilitate movement of the spinner head between the fittings. Fitting 148 includes a narrowing outlet, such that a smaller gage pipe can be used for pipe 121, thereby channeling a majority of the supplied water to the spinner head 122 and limiting how much of the water exits through outlet 126. Arrowhead 124 is illustrated to aid the spinner head assembly in penetrating the sandy floor.

Figure 16:
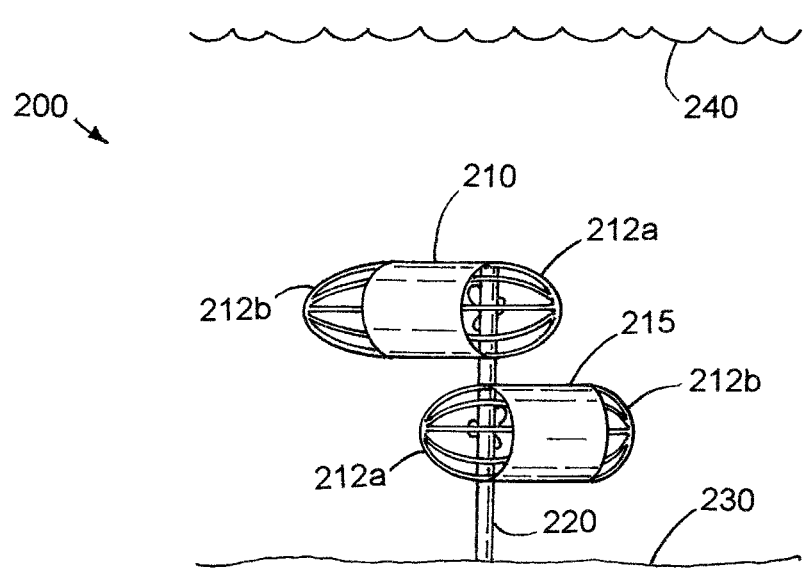
FIG. 16 illustrates two exemplary rip current sensors fixed to a pole, each sensor monitoring water current in a respective direction, in accordance with the present disclosure.

Sensors disclosed herein can include pivoting sensors to permit the sensor to move in a direction parallel to the current flow. Fixed sensors can be used. A series of fixed sensors could be aligned to be perpendicular to the beach and used solely to look for a rip current while ignoring longshore currents. A series of sensors perpendicular to the beach and a series of sensors parallel to the beach could be used to for rip and longshore currents, respectively. FIG. 16 illustrates two exemplary rip current sensors fixed to a pole, each sensor monitoring water current in a respective direction. Configuration 200 is illustrated. Sensors 210 and 215 are illustrated mounted to support 220, wherein the sensors are oriented at 90 degree angles to each other, such that one sensor can be used to monitor rip currents and the other sensor can be used to monitor longshore currents. Each sensor includes a first sensor mesh 212*a* and a second sensor mesh 212*b*. Located between sandy floor 230 and waterline 240, sensors 210 and 215 can monitor water current as disclosed herein.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus for generating a rip current warning indication, comprising:
   an anchor device comprising:
      a lower portion configured to be buried into a bottom of a body of water comprising a weighted anchor and at least one spray outlet hole located upon a bottom surface of the weighted anchor, the spray outlet hole being configured to aid installation and removal of the anchor device by selectively projecting a spray of water to displace soft debris on the bottom away from the weighted anchor; and
      an upper portion comprising a vertical pole extending upward from the bottom;
   a flow sensor affixed to the vertical pole, the flow sensor monitoring a water current speed; and
   a warning device in signal communication with the flow sensor and comprising a control module comparing the monitored water current speed to a water current speed threshold, the warning device generating the rip current warning indication based upon the comparing.

2. The apparatus of claim 1,
   wherein the flow sensor comprises a fin; and
   wherein the flow sensor is configured to turn in orientation with water current based upon the water current acting upon the fin.

3. The apparatus of claim 1, wherein the flow sensor comprises:
   a sensor motor/generator; and a plurality of impeller blades configured to turn the sensor motor/generator when a water current flows over the impeller blades;

wherein the flow sensor monitoring the water current speed comprises the sensor motor/generator providing an electrical signal proportional to a rotational velocity of a shaft the sensor motor/generator.

4. The apparatus of claim 3, wherein the sensor motor/generator and the plurality of impeller blades are contained within a cylindrical sensor body.

5. The apparatus of claim 3, wherein the sensor motor/generator and the plurality of impeller blades are contained within a sensor body comprising a tapered nozzle.

6. The apparatus of claim 1, wherein the warning device being in signal communication with the flow sensor comprises the flow sensor and the warning device being connected with a cable.

7. The apparatus of claim 1, wherein the warning device being in signal communication with the flow sensor comprises:
the flow sensor transmitting a signal, and
the warning device receiving the signal.

8. The apparatus of claim 1, wherein the flow sensor comprises:
a support extending above a waterline, and
a solar panel connected to the support and supplying electrical power to the sensor.

9. The apparatus of claim 1, wherein the flow sensor comprises a support extending above a waterline; and
wherein the warning device is connected to the support.

10. The apparatus of claim 1, wherein the warning device is located on a beach proximate to the flow sensor.

11. The apparatus of claim 1, wherein
the upper portion is connected to the lower portion with a flexing device, the flexing device permitting the vertical pole to move relative to the weighted anchor.

12. The apparatus of claim 1, wherein the weighted anchor device comprises:
a concrete anchor; and
a plurality of spray outlets.

13. The apparatus of claim 1, further comprising:
a pipe extending from the bottom of the weighted anchor;
an installation tip at the end of the pipe extending from the bottom of the concrete anchor; and
a tip jet opening at the end of the pipe configured to spray water from the tip jet opening during the installation.

14. The apparatus of claim 13, wherein the installation tip comprises an arrowhead tip.

15. The apparatus of claim 1, wherein the rip current warning indication comprises activation of a warning light.

16. The apparatus of claim 1, wherein the rip current warning indication comprises activation of one of a text message and an audio message.

17. The apparatus of claim 1, wherein the control module comparing the monitored water current speed to the water current speed threshold comprises the control module determining whether the monitored water current speed is greater than the water current speed threshold through a sustained duration of time.

18. The apparatus of claim 1, wherein the control module comparing the monitored water current speed to the water current speed threshold comprises:
the control module comparing the monitored water current speed to a first, lower water current speed threshold to determine if a rip current could be occurring; and
further comprising the control module comparing the monitored water current speed to a second, higher water current speed threshold to confirm that a rip current is occurring.

19. A system for generating a rip current warning indication, comprising:
a plurality of flow sensors located to a sandbar within a body of water, each of the flow sensors comprising an anchor device comprising a lower portion configured to be buried into a bottom of a body of water comprising a weighted anchor and at least one spray outlet hole located upon a bottom surface of the weighted anchor, the spray outlet hole being configured to aid installation and removal of the anchor device by selectively projecting a spray of water to displace soft debris on the bottom away from the weighted anchor, and an upper portion comprising a vertical pole extending upward from the bottom, wherein the flow sensor is affixed to the vertical pole, wherein the flow sensor monitors a water current speed, and wherein the flow sensor is configured to turn with a current flow; and
a warning device in signal communication with the flow sensor and comprising a control module comparing the monitored water current speed to a water current speed threshold, the warning device generating the rip current warning indication based upon the comparing.

20. A method to indicate a rip current warning, the method comprising:
installing an anchor device into a bottom of a body of water, the anchor device comprising a lower portion configured to be buried into the bottom comprising a weighted anchor and at least one spray outlet hole located upon a bottom surface of the weighted anchor, the spray outlet hole being configured to aid installation and removal of the anchor device by selectively projecting a spray of water to displace soft debris on the bottom away from the weighted anchor, and an upper portion comprising a vertical pole extending upward from the bottom, the installing comprising pumping water through the at least one spray outlet hole;
installing a flow sensor to the vertical pole;
in an electronically controlled control module:
monitoring a water current speed signal generated by the flow sensor located in the body of water proximate to a beach;
comparing the water current speed signal to a water current speed threshold;
generating a rip current indication signal based upon the comparing; and
in a warning device, automatically generating a rip current warning based upon the rip current indication signal.

* * * * *